United States Patent
Nakamura

(10) Patent No.: US 6,347,801 B1
(45) Date of Patent: Feb. 19, 2002

(54) METAL LAMINATE GASKET WITH THICKNESS ADJUSTING MECHANISM

(76) Inventor: Hironobu Nakamura, c/o Ishikawa Gasket Co., Ltd., 44-18, Senju Okawa-cho, Adachi-ku, Tokyo (JP)

(*) Notice: Subject to any disclaimer, the term of this patent is extended or adjusted under 35 U.S.C. 154(b) by 0 days.

(21) Appl. No.: 09/492,751

(22) Filed: Jan. 27, 2000

(30) Foreign Application Priority Data

Feb. 1, 1999 (JP) .......................................... 11-023921

(51) Int. Cl.$^7$ ................................................ F02F 11/00
(52) U.S. Cl. ....................................... 277/598; 277/593
(58) Field of Search ................................. 277/591, 593, 277/594, 595, 598

(56) References Cited

U.S. PATENT DOCUMENTS

| | | | |
|---|---|---|---|
| 4,648,607 A | * | 3/1987 | Yamada et al. |
| 4,813,691 A | * | 3/1989 | Schoenborn |
| 4,867,462 A | * | 9/1989 | Udagawa |
| 5,141,237 A | * | 8/1992 | Yamade et al. |
| 5,873,577 A | * | 2/1999 | Inamura |
| 5,957,463 A | * | 9/1999 | Inamura |
| 6,027,124 A | * | 2/2000 | Ishida et al. |
| 6,113,110 A | * | 9/2000 | Hasegawa |

FOREIGN PATENT DOCUMENTS

| | | | |
|---|---|---|---|
| DE | 4126744 A1 | * | 2/1993 |
| DE | 4240132 A1 | * | 6/1994 |
| EP | 0 486 255 | | 5/1992 |
| EP | 590944 A1 | * | 4/1994 |
| EP | 0 809 051 | | 11/1997 |
| EP | 0 864 785 | | 9/1998 |
| EP | 0 866 246 | | 9/1998 |
| JP | 401211660 A | * | 8/1989 |

* cited by examiner

*Primary Examiner*—Anthony Knight
*Assistant Examiner*—Vishal Patel

(57) ABSTRACT

A metal laminate gasket for an internal combustion engine is formed of a first metal plate and one of plate combinations. The first metal plate includes a base portion, a curved portion to define a first hole, and a flange located under the base portion. Each plate combination includes an annular shim disposed between the flange and the base portion, and a second metal plate disposed under the base portion without laminating the annular shim and the flange. The thickness of the second metal plate is greater than the thickness of the annular shim and less than the total thicknesses of the annular shim and the flange. Each plate combination has the annular shim and the second metal plate with different thicknesses while keeping a difference in thickness between the annular shim and the second metal plate constant. Thus, the gaskets having the same grades with different thicknesses are formed by changing the plate combinations.

3 Claims, 2 Drawing Sheets

METAL LAMINATE GASKET WITH THICKNESS ADJUSTING MECHANISM

BACKGROUND OF THE INVENTION AND RELATED ART STATEMENT

The present invention relates to metal laminate gaskets with thickness adjusting mechanisms for internal combustion engines, which can provide the same grades with different thicknesses.

In the internal combustion engines, the cylinder heads and cylinder blocks are mass-produced in the same methods and conditions. However, when the cylinder head and the cylinder block are assembled together without a gasket therebetween, slight deviations or changes appear in the gap between the cylinder head and the cylinder block. Namely, the gap between the cylinder head and the cylinder block is different individually.

In order to provide the engines with the same qualities and characteristics, it is required to form the same surface pressures on the gasket when the engines are assembled. Thus, in case the gap between the cylinder head and the cylinder block is different, a gasket with different thickness is installed between the cylinder head and the cylinder block. In this case, it is required in each gasket that a difference in thicknesses between a sealing portion around a cylinder bore and a portion away from the sealing portion is made constant, while the thickness of the gasket is changed.

In case a gasket is formed of a first metal plate with a turned portion, i.e. curved portion and flange, and at least one second metal plate laminating with the first plate without overlapping the flange, which is known in the art, if the thicknesses of the first and second metal plates are changed, the above requirements can be satisfied. However, since the first plate is turned at the curved portion, the first plate must have the minimum thickness. Otherwise, when the first plate is turned at the curved portion, the curved portion may have a crack. Thus, it is not practical to form different grade gaskets by changing the thickness of the metal plate with the curved portion.

If an additional plate laminating with the flange and the second plate is used together with the first and second metal plates, in case the thickness of the additional plate is adjusted, the above requirements can be satisfied. However, since the gasket has three metal plates, the minimum thickness of the gasket becomes relatively thick. Thus, this structure is not suitable for a thin gasket.

In addition to the above gaskets, U.S. Pat. No. 5,435,575 discloses a gasket formed of three metal plates with a seal ring, which can securely seal around the gasket. Also, U.S. Pat. No. 5,141,237 discloses a gasket with a plate information device, which can identify the gaskets with different types. The prior art patents work properly as intended, but the improvement of the gasket is still required.

In view of the conventional gaskets, the present invention has been made, and an object of the invention is to provide a metal laminate gasket with a thickness adjusting mechanism to provide different grade gaskets easily.

Another object of the invention is to provide a metal laminate gasket as stated above, wherein the thickness of the gasket can be changed easily without causing a damage to the gasket.

A further object of the invention is to provide a metal laminate gasket as stated above, which is made relatively thin.

A still further object of the invention is to provide a metal laminate gasket as stated above, wherein the gaskets with different thicknesses can be identified easily.

Further objects and advantages of the invention will be apparent from the following description of the invention.

SUMMARY OF THE INVENTION

A metal laminate gasket of the invention is used for an internal combustion engine. Especially, the gasket is suitable for a cylinder head gasket for sealing around a cylinder bore.

The gasket is basically formed of a first metal plate, and one plate combination selected from a plurality of plate combinations laminated with the first metal plate. The first metal plate includes a base portion extending substantially throughout an entire area to be sealed, a curved portion extending from the base portion to define a first hole therein corresponding to the cylinder bore to be sealed, and a flange extending from the curved portion in a direction away from the first hole.

Each plate combination includes an annular shim disposed between the flange and the base portion, and a second metal plate having a second hole and disposed under the base portion without laminating the annular shim and the flange. The thickness of the second metal plate is greater than the thickness of the annular shim and less than the total thicknesses of the annular shim and the flange. Thus, when the gasket is tightened, the surface pressure on the flange is greater than that formed on the second metal plate outside the flange to securely seal around the first hole. Also, the difference of the surface pressures formed on the flange and the second metal plate can be precisely set by adjusting the thicknesses of the annular shim and the second metal plate.

Each plate combination has different thicknesses in the annular shim and the second metal plate while keeping a difference in thicknesses between the annular shim and the second metal plate constant. Namely, the annular shim and the second metal plate in one plate combination are different in thicknesses from the annular shim and the second metal plate in another plate combination, respectively. However, the difference of the thicknesses between the annular shim and the second metal plate is constant in one and another plate combinations. Thus, the gaskets having the same grades with different thicknesses are formed easily by changing the plate combinations.

In installing the gasket between the cylinder head and the cylinder block, at first, the cylinder head and the cylinder block are laminated without a gasket, and a gap or clearance between the cylinder head and the cylinder block is measured. Then, the cylinder head is removed from the cylinder block, and the gasket with an appropriate size is selected based on the size of the gap and is situated on the cylinder block. Then, the cylinder head is once again placed on the cylinder block with the gasket therebetween, and the cylinder head and the cylinder block are tightened.

In this respect, a gasket with a predetermined thickness is installed in a predetermined range of a gap between the cylinder head and the cylinder block without the gasket. Namely, if the gap is large, a thick gasket is installed between the cylinder head and the cylinder block. Therefore, the engines with the same qualities and characteristics can be formed regardless of the gap between the cylinder head and the cylinder block.

In the invention, since the thicknesses of the annular shim and the second metal plate are changed in changing the thickness of the gasket without changing the thickness of the first metal plate, the quality of the gasket can be maintained at the same level. Namely, even if the thickness of the gasket is reduced, since the thickness of the first metal plate is not changed and is constant, which is appropriate to form the curved portion, there is no possibility of causing the damage at the curved portion.

In this respect, if the thickness of the first metal plate is changed in changing the thickness of the gasket, when the first metal plate is bent at the curved portion, the cuved portion may have a crack depending on the quality of the first metal plate and the thickness thereof. In the invention, since the thickness of the first metal plate is not changed in changing the thickness of the gasket, the first metal plate can be surely bent at the curved portion, so that the quality of the gasket is kept constant.

In the invention, each of the plate combinations has a sign for indicating the plate combination. The signs are different depending on the differences of the thickness of the plate combinations. Each sign of the plate combination includes a projection with an indentation formed at one of the annular shim and the second plate, and a dent for receiving the projection formed at the other of the annular shim and the second plate.

In the invention, since the signs are formed on the gaskets, the gaskets with different thicknesses can be identified easily. Also, since the sign is formed of the projection and the dent, the sign does not affect the sealing ability of the gasket.

Preferably, the first metal plate includes a first bead around the first hole, which is located above and extends toward the flange, and the annular shim includes a second bead located on the flange and extending toward the base portion. The cylinder bore can be securely sealed by the beads.

DETAILED DESCRIPTION OF PREFERRED EMBODIMENTS

Figure 1:
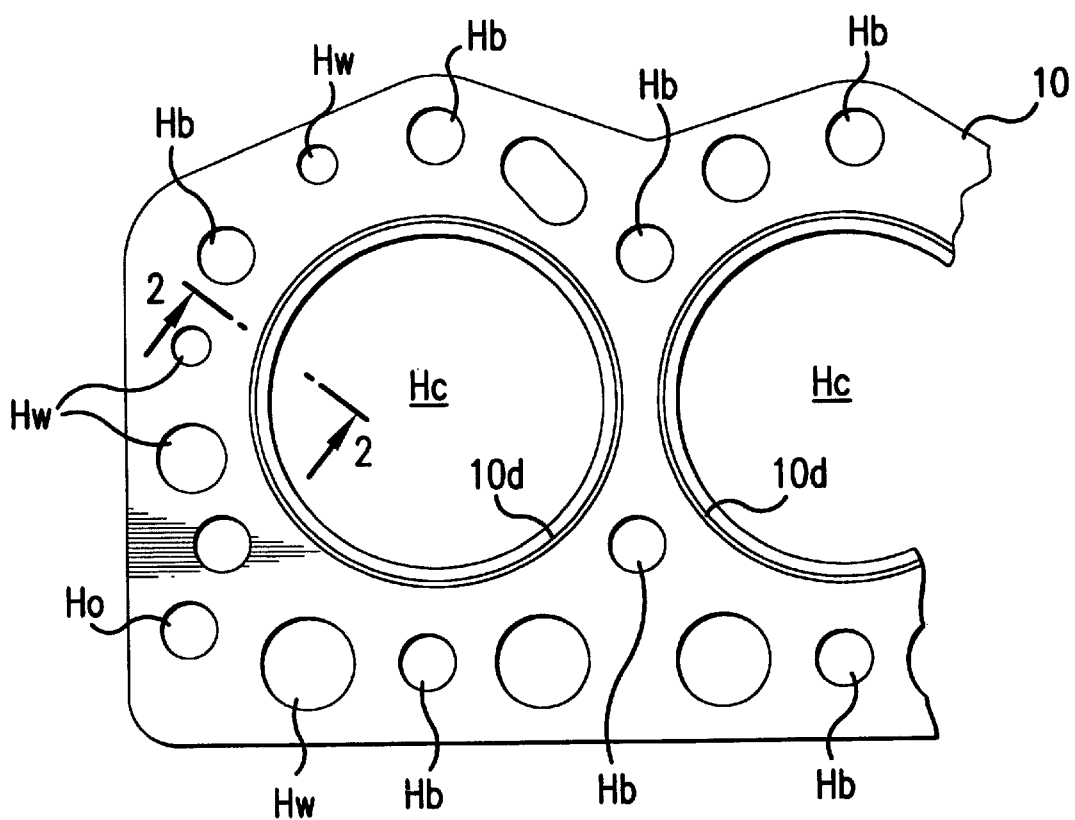
FIG. 1 is a plan view of a part of a cylinder head gasket of the invention.
Figure 2:
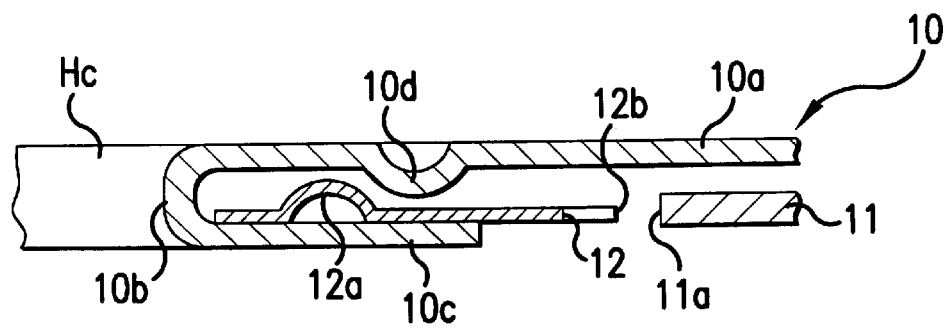
FIG. 2 is an enlarged sectional view taken along line 2—2 in FIG. 1.
Figure 3:
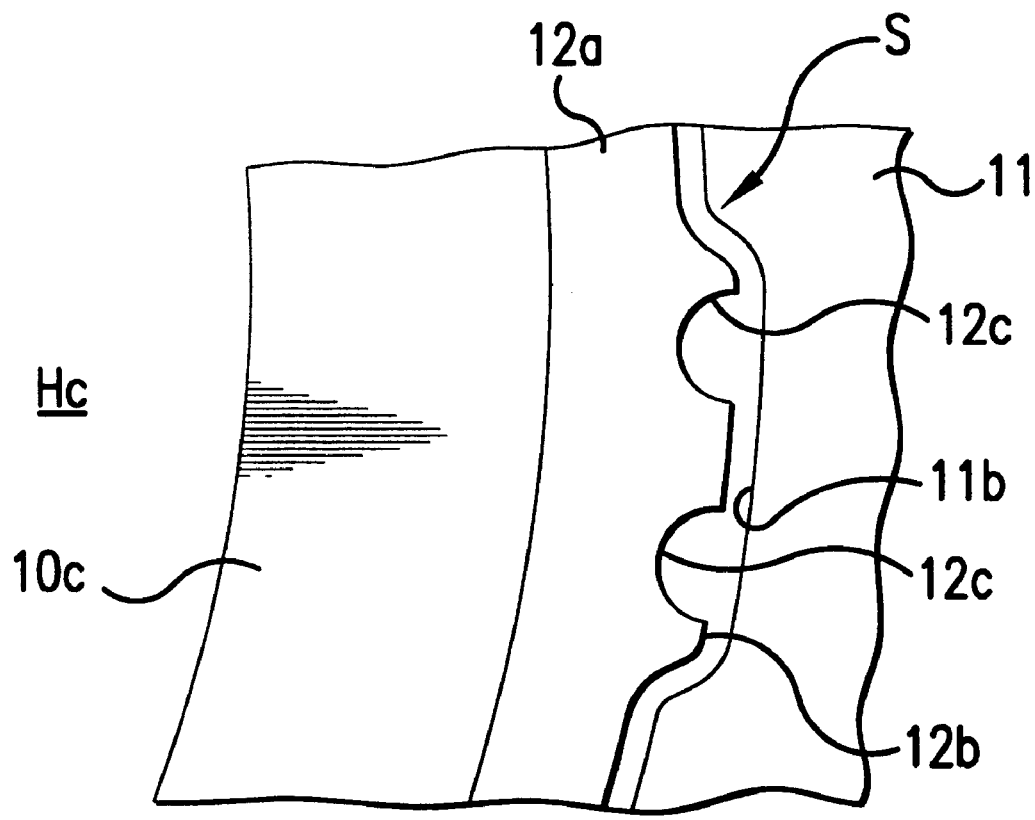
FIG. 3 is an enlarged bottom view of the cylinder head gasket of the invention.

The present invention will be explained with reference to the accompanying drawings.

The gasket as shown in the drawings is a cylinder head gasket to be installed between a cylinder head and a cylinder block (both not shown). The gasket includes a plurality of cylinder bores Hc, water holes Hw, oil holes Ho, bolt holes Ho, and so on, as in the conventional gasket. In this gasket, the invention is applied to the sealing structure around the cylinder bores. Thus, the sealing structure around the cylinder bore is only explained hereunder, but the sealing structure of the invention may be applied to other sealing mechanism.

The gasket of the invention is formed of an upper plate 10, a lower plate 11 and an annular shim 12. The lower plate 11 and the annular shim 12 form a plate combination.

The upper plate includes a base portion 10a extending substantially throughout an entire area to be sealed, a curved portion 10b extending from the base portion 10a to define the cylinder bore Hc, and a flange 10c extending from the curved portion 10b. A bead 10d is formed in the base portion 10a to extend toward the flange 10c.

The lower plate 11 is disposed under the base portion 10a to extend substantially throughout the entire area. The lower plate 11 has a hole 11a greater than the flange 10c, so that the lower plate 11 does not laminate the flange 10c.

The annular shim 12 is situated radially outside the curved portion 10b between the flange 10c and the base portion 10a. The shim 12 has a bead 12a extending toward the base portion 10a.

In the invention, the thickness of the lower plate 11 is greater than the thickness of the shim 12 and less than the total thicknesses of the shim 12 and the flange 10c. The thicknesses of the lower plate 11 and the shim 12 are selected such that the total thicknesses of the shim 12 and the flange 10c are slightly greater than the thickness of the lower plate 11. Thus, when the gasket is situated between the cylinder head and the cylinder block and is tightened, the flange 10c and the shim 12 provide a surface pressure greater than that on the lower plate 11 outside the flange 10c to securely seal around the cylinder bore Hc.

In the invention, the lower plate 11 and the shim 12 form the plate combination to change the thickness of the gasket. Namely, one plate combination of the lower plate 11 and the shim 12 has a difference in thickness between the lower plate 11 and the shim 12. This difference in thickness is constant in any plate combination though the thicknesses of the lower plate 11 and the shim 12 are different.

Therefore, when one plate combination is assembled with the upper plate 10, the gasket has the predetermined thicknesses, i.e. first thicknesses, on the flange 10c and the lower plate 11. When another plate combination is assembled with the same upper plate 10, the gasket has the predetermined thicknesses, i.e. second thicknesses, on the flange 10c and the lower plate 11. However, the difference in thickness between the flange 10c and the lower plate 11 is the same in the first and second thicknesses.

Thus, in case a gap between the cylinder head and the cylinder block without the gasket is different, the gasket with the different thickness is installed. Namely, if the gap is large, the thick gasket is installed, while if the gap is small, the thin gasket is installed. In this situation, since the difference in thickness between the flange 10c and the lower plate 11 is constant even if the thicknesses of the gaskets are different, the difference of the surface pressures on the flange and the lower plate is substantially constant. Therefore, the engines can provide the constant characteristics even if the gaps are different.

In the invention, a plurality of plate combinations with different thicknesses is prepared and assembled with the same upper plates to thereby form the gaskets with different thicknesses. The gasket with the appropriate thickness is installed in the engine depending on the gap between the cylinder head and the cylinder block.

In the invention, since the gaskets with the different thicknesses, which can not be recognized when observed, are prepared, the gaskets include signs for indicating the thicknesses of the gaskets. The sign S includes a projection 12b with indentations 12c formed at the annular shim 12, and a dent 11b formed at the lower plate 11. The number of the indentations 12c is different according to the difference of the thickness of the annular shim 12. Since the outer edge of the annular shim 12 extends radially outwardly beyond the flange 10c, the projection 12b can be seen from the back side of the gasket. Also, since the projection 12b is located in the dent 11b and is formed at a portion away from a sealing mechanism of the gasket, the sign does not affect the sealing mechanism.

In the sign S, the dent 11b may have small projections entering into the indentations 12c, so that the combination of the lower plate 11 and the annular shim 12 can be identified when the gasket is assembled. Other appropriate signs may be used on the gasket.

In the invention, a plurality of plate combinations with different thicknesses is prepared and combined with the upper plate with the same thickness. Thus, the gaskets with different thicknesses are formed without changing the thickness of the gaskets plate, while the qualities and the characteristics of the gaskets are the same. Also, the thin gasket, the main thickness being determined by the upper and lower plates, can be prepered. Further, the thicknesses of the gasktes can be easily identified by the signs on the gaskets.

While the invention has been explained with reference to the specific embodiments of the invention, the explanation is illustrative and the invention is limited only by the appended claims.

What is claimed is:

1. A metal laminate gasket for an internal combustion engine having a hole to be sealed, comprising:

a first metal plate having a base portion extending substantially throughout an entire area to be sealed, a curved portion extending from the base portion to define a first hole therein corresponding to the hole to be sealed, and a flange extending from the curved portion in a direction away from the first hole, and one plate combination selected from a plurality of plate combinations and laminated with the first metal plate, each plate combination including an annular shim disposed between the flange and the base portion, and a second metal plate having a second hole and disposed under the base portion without being laminated to the annular shim and the flange, said annular shim having a width greater than that of the flange so that an outer edge of the annular shim is located radially outside the flange, the thickness of the second metal plate being greater than the thickness of the annular shim and less than total thicknesses of the annular shim and the flange, the annular shim and the second metal plate in one plate combination being different in thicknesses from those in another plate combination while keeping a difference in thickness between the annular shim and the second metal plate constant so that gaskets having same grades with different thicknesses are formed by changing the plate combinations, each of said plate combinations having a sign for indicating the plate combination disposed outside the flange, each sign of the plate combination having a projection with an indentation formed at one of the annular shim and the second plate, and a dent for receiving the projection with the indentation formed at the other of the annular shim and the second plate.

2. A metal laminate gasket according to claim 1, wherein said first metal plate includes a first bead around the first hole, said first bead being located above and extending toward the flange, and said annular shim includes a second bead located on the flange and extending toward the base portion.

3. A metal laminate gasket according to claim 1, wherein said annular shim includes the projection with the indentation and located in the dent formed in the second plate, a number of indentations formed in the annular shim being different according to difference of the thickness of the annular shim.

* * * * *

UNITED STATES PATENT AND TRADEMARK OFFICE
CERTIFICATE OF CORRECTION

PATENT NO. : 6,347,801 B1
DATED : February 19, 2002
INVENTOR(S) : Hironobu Nakamura It is certified that error appears in the above-identified patent and that said Letters Patent is hereby corrected as shown below:

Title page,
Under "Assistant Examiner - Vishal Patel", add -- [74] *Attorney, Agent, or Firm* - Kanesaka & Takeuchi --;
Item [57] ABSTRACT,
Line 8, change "laminating" to -- overlapping --;

Column 3,
Line 51, change "Ho" to -- Hb --; and

Column 5,
Line 8, change "gaskets" to -- upper --.

Signed and Sealed this

Twenty-eighth Day of May, 2002

Attest:

Attesting Officer

JAMES E. ROGAN
*Director of the United States Patent and Trademark Office*